March 28, 1944.  C. DE LANGE ET AL  2,345,038
BLOCKING-LAYER RECTIFIER COMPRISING COOLING PLATES
Filed May 29, 1941
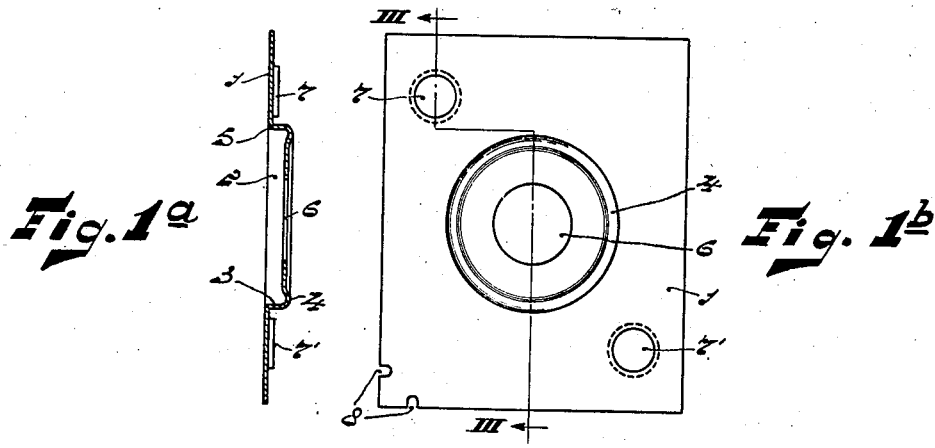
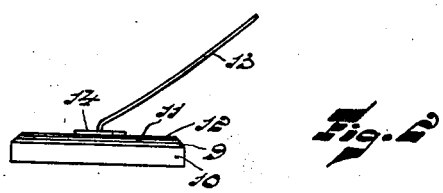
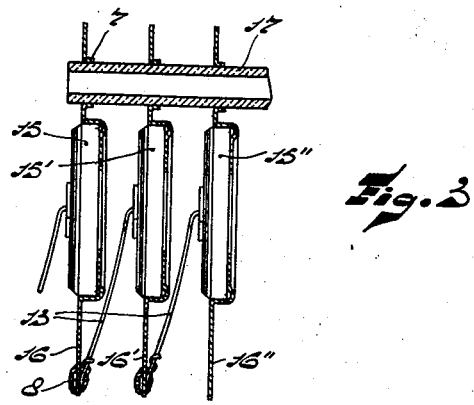
INVENTORS
C. de Lange and
C.L. Boucher
By
E.F. Wendroth
ATTORNEYS Patented Mar. 28, 1944

2,345,038

UNITED STATES PATENT OFFICE 2,345,038

BLOCKING-LAYER RECTIFIER COMPRISING A COOLING PLATE

Cornelis de Lange and Charles Louis Boucher, Eindhoven, Netherlands; vested in the Alien Property Custodian Application May 29, 1941, Serial No. 395,874
In the Netherlands June 12, 1940

8 Claims. (Cl. 175—366)

This invention relates to a blocking-layer rectifier comprising a cooling plate. Various constructions have already been proposed to render the cooling as effective as possible, but an efficient transfer of the heat evolved in a rectifying cell to the cooling plate has always been a difficult problem. The following facts have to be taken into account. The conductivity of the contact parts between cell and cooling plate should be as high as possible. The construction must be as simple and light as possible, since otherwise the assembly would become too heavy, too expensive and too bulky.

The problem of interconnection of the cells is also to be considered. Hitherto a construction has rather commonly been used, in which the cells (and also the cooling plates) had a central bore which received a bolt. In this way the cells were consequently placed in a row. Particularly in regard to cells having a small size this construction has the drawback that due to the bore a considerable part of the surface of the cell-plate is lost for rectification.

The present invention has for its purpose to procure means for avoiding the above-mentioned drawbacks.

According to the invention the cooling plate is provided with a cavity accommodating the disc-shaped rectifying cell and is equipped with fastening means for the assemblage of a number of rectifying cells.

The assembly according to the invention yields a rectifier in which an excellent thermal contact between the cell and the cooling plate is established without the need for other mechanical means. Hence the cells may have an unprecedented small size for a given load capacity. Since there is no central bore for a fastening bolt, the surface of the cell is completely utilised. In fact, interconnection of the cells is effected by means of the cooling plates, and since each of the latter is mechanically fixed in a rigid manner to a cell the fixation of the cells is assured at the same time.

The construction according to the invention is very advantageous particularly for cells having a small surface such as used at small loads, since interconnection of the cells is not effected on the cell itself but through the intermediacy of the corresponding cooling plate. Consequently the difficulty of providing the small cells with fastening means is disposed of. Preferably, the rectifying cell is so secured in the cavity of the cooling plate as to be clamped therein.

In a suitable form of construction of the invention the bottom of the cavity in the cooling plate exhibits an annular groove. In this way it is achieved that the wall accommodating the rectifying disc is resilient which yields an excellent clamping effect. The groove also permits the rectifying disc to be pressed on to the bottom of the cavity. Generally the cavity will be formed by pressing. In this case, however, it is impossible to obtain a sharp corner. Upon introduction of the disc it would consequently bear on the rounded corner instead of bearing on the bottom itself and there would be a risk of disconnection. Therefore, the cavity preferably has a conical side wall. Upon introduction of the rectifying disc into a cavity this wall is expanded, this expansion being assisted in by the annular groove provided in the bottom of the cavity.

The method of securing the rectifying disc to the cooling plate may serve not only for the transmission of heat but also for conveying electric current. In this way special means for establishing electric contact between one of the electrodes of the cell and an external circuit are disposed of.

The invention will be more fully explained by reference to the accompanying drawing.

Fig. 1 represents the cooling plate of a rectifying cell, 1a being a section, and 1b being an elevation of the plate.

Fig. 2 shows a section of the cell to be secured in the cooling plate and

Fig. 3 shows, in section, the construction of a plurality of rectifying cells assembled with their cooling plates to form a unit, the section being taken on the line III—III in Fig. 1b.

From Fig. 1a it appears that the square cooling plate 1 has a central cavity 2. The first part of the walls 3 of this cavity is slightly conical and there is provided an annular groove 4. The diameter of the cavity in the plane of the plate itself, i. e. at 5, corresponds to the diameter of the rectifying disc shown in Fig. 2. Owing to the conical shape of the cavity and the provision of groove 4 the rectifying disc engages the cavity under spring control thus obtaining a perfect thermal contact over the whole periphery of the rectifying disc. It may still be observed in this respect that the conicity of the cavity may not be exaggerated, since otherwise the rectifying disc would disengage from the cavity. The bottom of the cavity 2 is furnished with a central aperture 6 which serves to counteract cracking upon pressing the cavity and to confer more resiliency on the assembly. If the disc is secured by soldering to the cooling plate the aperture 6 may at the same time be used for providing the solder between the disc and the plate.

Furthermore Fig. 1a shows two apertures with raised edges 7 and 7' obtained by punching in such manner as to form an upstanding rim. The location of these apertures appears more particularly from Fig. 1b in which corresponding parts bear the same reference numerals. The purpose of the rims will be more fully explained later by reference to Fig. 3. At one corner of the plate are provided incisions 8 facilitating the attachment of a junction wire for the soldering operation. In fact, the wire is first clamped to the plate by means of these incisions.

Fig. 2 represents the disc-shaped rectifier. The substratum 10 of aluminium carries the selenium electrode 9. This selenium electrode carries, with the interposition of the blocking layer 11, the counter-electrode 12 which consist of an alloy of tin, bismuth and cadmium and melts at about 100° C. It will be appreciated that the ratio of the thickness of the electrodes, blocking-layer and substratum are not represented to scale.

The supply conductor for the counter-electrode 12 consists of a wire 13 which is wound to form a spiral 14 at its end, which is dipped in the same alloy material which is also used for the counter-electrode.

Since the cooling plate is in direct electrical contact with the substratum 10, and consequently with the electrode 9 the electrode 12 should be prevented from likewise being in contact with the cooling plate. As shown in the drawing the difficulty is solved by giving the top of the disc a conical shape (for instance by grinding or turning). As an alternative, however, the alloy may be applied to the blocking layer by means of a templet in such manner that the outer edge is left clear.

As shown in Figures 1 and 2 the cooling plate together with the rectifying disc fastened therein may now be incorporated in a rectifying unit, the assembly being accommodated to the voltage to be applied and to the current to be passed, while taking into account the load-capacity per cell. The construction of such a unit appears from Fig. 3, in which 15, 15', 15" designate the rectifying discs, and 16, 16', 16" denote the cooling plates. The cooling plates are interconnected through the intermediacy of rods 17 of insulating material such as porcelain, which are slipped through the apertures 7 having raised edges (see also Fig. 1a). The rods 17 have a diameter corresponding to that of the apertures 7 so that the cooling plates are clamped on the rods. The purpose of the raised edges is, obviously, to avoid deformation of the unit.

Of the unit shown in Fig. 3 there are represented only three cooling plates with clamped rectifying discs. The diameter of the rectifying discs amounts to 14 mms. The dimensions of the cooling plates are 26 x 30 mm². The rectifying discs are all connected in series. To this end a wire 13 is at any instance soldered to the adjacent cooling plate 16 in the way indicated by the numeral 8 in Fig. 1 and described in the part of the description corresponding to this figure.

The blocking layer cells may have a maximum blocking voltage (counter voltage) of say 35 volts. For a definite use 13 cells, for instance, are connected in series. In this case the maximum direct output current prescribed has a value of 66 M. T. The number of cells depends on the use of the rectifying unit and in accordance therewith they may be connected in series, in parallel or in series-parallel.

The iron cooling plates may be bare or galvanised (for instance copper-plated) not only for promoting the transmission of heat to the surrounding air but also to facilitate the soldering of the supply conductors.

In order further to promote the transmission of heat it is advisable that the surfaces of the plates should be coated with a black lacquer, which may be effected, for instance, by dipping them in a lacquer containing graphite. After the layer has been dried the rectifying unit is protected, moreover, against the chemical action of materials contained in the atmosphere, which is of particular importance when such a unit is used for galvanising purposes. In order to prevent the layer of lacquer from establishing undesirable electrical connections between the various parts of the rectifying unit it may be desirable first to coat the rectifier with a non-conductive kind of lacquer, after which the assembly is dipped in the lacquer containing graphite.

It has been found that owing to the presence of a layer of lacquer the rectifier is not only protected against chemical action from without, but in addition that the mechanical strength of the various connections, for instance, soldered joints, has been materially increased.

We wish it to be understood that we do not desire to be limited to the exact details of construction and design shown and described, as various modifications within the scope of the appended claims may occur to a person skilled in the art.

What we claim is:

1. A rectifier unit comprising a cooling plate having a cup-shaped portion, a plate-shaped blocking-layer rectifier cell disposed within said cup-shaped portion, means comprising said cup-shaped portion fixedly clamping said cell in the cup-shaped portion, and means independent of said first means to support the rectifier unit at a point of the cooling plate outside the cup-shaped portion.

2. A rectifier unit comprising a cooling plate having a resilient cup-shaped portion and an annular groove formed in the bottom of said portion, a plate-shaped blocking-layer rectifier cell disposed within said cup-shaped portion, means comprising said cup-shaped portion fixedly holding said cell in the cup-shaped portion, and means independent of said first means to support the rectifier unit at a point of the cooling plate outside the cup-shaped portion.

3. A rectifier unit comprising a cooling plate having a resilient cup-shaped portion having an annular groove formed in the bottom thereof and having a conical-shaped wall, a plate-shaped blocking-layer rectifier cell disposed within said cup-shaped portion, means fixedly holding said cell in the cup-shaped portion, and means independent of said first means to support the rectifier unit at a point of the cooling plate outside the cup-shaped portion.

4. A rectifier unit comprising a cooling plate having a cup-shaped portion, a plate-shaped blocking-layer rectifier cell disposed within said cup-shaped portion and comprising a substratum and a rectifier element comprising an electrode, a blocking layer and a counter-electrode superimposed on the substratum, means fixedly holding said cell in the cup-shaped portion, said substratum electrically connecting the electrode of the element with the cooling plate, a supply conductor electrically connected to the counter-electrode of said element, and means independent of said first means to support the rectifier unit at a point of the cooling plate outside the cup-shaped portion.

5. A rectifier unit comprising a cooling plate having a cup-shaped portion, a disc-shaped blocking-layer rectifier cell disposed within said cup-shaped portion, said cell comprising a substratum and a rectifier element comprising an electrode, a blocking layer and a counter-electrode superimposed on the substratum, said substratum contacting the internal surface of said cup-shaped portion and electrically connecting the electrode with the cooling plate, said counter-electrode having a diameter which is smaller than the inner diameter of the cup-shaped portion, means fixedly holding said cell in the cup-shaped portion, and means independent of said first means to support the rectifier unit at a point of the cooling plate outside the cup-shaped portion.

6. A rectifier unit comprising a cooling plate having a cup-shaped portion, a disc-shaped blocking-layer rectifier cell disposed within said cup-shaped portion, said cell comprising a substratum and a rectifier element comprising an electrode, a blocking layer and a counter-electrode superimposed on said substratum, said cell having a substantially conical shape and having its minimum diameter at the location of the counter-electrode less than the inner diameter of the cup-shaped portion, means fixedly holding said cell in the cup-shaped portion, and means independent of said first means to support the rectifier unit at a point of the cooling plate outside the cup-shaped portion.

7. A rectifier unit comprising a cooling plate having a cup-shaped portion, a disc-shaped blocking-layer rectifier cell disposed within said cup-shaped portion, said cell comprising a substratum, an electrode, a blocking layer and a counter-electrode in superposed relationship on said substratum and integral therewith, said counter-electrode having a surface area less than that of the blocking layer and exposing the outer edge of the blocking layer, means fixedly holding said cell in the cup-shaped portion, and means independent of said first means to support the rectifier unit at a point of the cooling plate outside the cup-shaped portion.

8. A rectifier assembly comprising a plurality of rectifier units, each of said units comprising a cooling plate having a cup-shaped portion, a plate-shaped blocking-layer rectifier cell disposed within said cup-shaped portion, means fixedly holding said cell in the cup-shaped portion, and means independent of said first means to support the rectifier units in the assembly, said means comprising a supporting rod passing through an aperture in the cooling plate formed at a point outside the cup-shaped portion, said cooling plates having raised edges at said apertured portions engaging said supporting rod.

CORNELIS DE LANGE.
CHARLES LOUIS BOUCHER.